(12) United States Patent
Gottmann

(10) Patent No.: US 7,846,600 B2
(45) Date of Patent: Dec. 7, 2010

(54) ADAPTIVE PURGE CONTROL TO PREVENT ELECTRODE REDOX CYCLES IN FUEL CELL SYSTEMS

(75) Inventor: Matthias Gottmann, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1112 days.

(21) Appl. No.: 11/524,241

(22) Filed: Sep. 21, 2006

(65) Prior Publication Data

US 2008/0075985 A1    Mar. 27, 2008

(51) Int. Cl.
    *H01M 8/04*    (2006.01)
(52) U.S. Cl. .................. 429/432; 429/429; 429/430; 429/431
(58) Field of Classification Search .................. 429/13, 429/21, 407, 429, 430, 431, 432, 444
    See application file for complete search history.

(56) References Cited

U.S. PATENT DOCUMENTS

| | | | |
|---|---|---|---|
| 4,272,353 A | 6/1981 | Lawrence et al. |
| 4,898,792 A | 2/1990 | Singh et al. |
| 4,917,971 A | 4/1990 | Farooque |
| 4,983,471 A | 1/1991 | Reichner et al. |
| 5,034,287 A | 7/1991 | Kunz |
| 5,047,299 A | 9/1991 | Shockling |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,441,821 A | 8/1995 | Merritt et al. |
| 5,498,487 A | 3/1996 | Ruka et al. |
| 5,527,631 A | 6/1996 | Singh et al. |
| 5,573,867 A | 11/1996 | Zafred et al. |
| 5,601,937 A | 2/1997 | Isenberg |
| 5,733,675 A | 3/1998 | Dederer et al. |
| 5,741,605 A | 4/1998 | Gillett et al. |
| 6,013,385 A | 1/2000 | DuBose |
| 6,051,125 A | 4/2000 | Pham et al. |
| 6,280,865 B1 | 8/2001 | Eisman et al. |
| 6,329,090 B1 | 12/2001 | McElroy et al. |
| 6,403,245 B1 | 6/2002 | Hunt |
| 6,436,562 B1 | 8/2002 | DuBose |
| 6,677,070 B2 | 1/2004 | Kearl |
| 6,854,688 B2 | 2/2005 | McElroy et al. |
| 6,924,053 B2 | 8/2005 | McElroy |
| 7,150,927 B2 | 12/2006 | Hickey et al. |
| 2002/0058175 A1 | 5/2002 | Ruhl |

(Continued)

OTHER PUBLICATIONS

Cell and Stack Construction: Low-Temperature Cells, L.G. Austin, NASA Sp-120, 1967.

(Continued)

*Primary Examiner*—Patrick Ryan
*Assistant Examiner*—Ben Lewis
(74) *Attorney, Agent, or Firm*—The Marbury Law Group PLLC

(57) ABSTRACT

A method of operating a fuel cell system during a fuel outage or shortage includes detecting an open circuit voltage (OCV) of the fuel cell system, and providing a reducing purge gas flow to anode electrodes of fuel cells of the fuel cell system when the OCV approaches, reaches or falls below a threshold value below which oxidation of the anode electrodes occurs.

12 Claims, 4 Drawing Sheets

U.S. PATENT DOCUMENTS

| | | | |
|---|---|---|---|
| 2004/0081859 | A1 | 4/2004 | McElroy et al. |
| 2004/0137292 | A1* | 7/2004 | Takebe et al. ............ 429/23 |
| 2004/0191595 | A1 | 9/2004 | McElroy et al. |
| 2005/0053812 | A1 | 3/2005 | Hickey et al. |
| 2005/0164051 | A1 | 7/2005 | Venkataraman et al. |
| 2005/0227134 | A1 | 10/2005 | Nguyen et al. |
| 2005/0238935 | A1 | 10/2005 | Ueda et al. |
| 2006/0199064 | A1* | 9/2006 | Arnold et al. ............ 429/34 |
| 2006/0222929 | A1 | 10/2006 | Hickey et al. |

OTHER PUBLICATIONS

Low Cost, High Efficiency Reversibile Fuel Cell Systems, Proceedings of the 2002 U.S. DOE Hydrogen Program Review, NREL/CP-610-32405.

Low Cost Reversibile Fuel Cell System, Proceedings of the 2000 U.S. DOE Hydrogen Program Review, Jun. 15, 2000, NREL/CP-570-28890.

Low Cost, Compact Solid Oxide Fuel Cell Generator, NASA Small Business Innovation Research Program.

Small, Ultra Efficient Fuel Cell Systems, Advanced Technology Program ATP 2001 Competition (Jun. 2002).

Low Cost, High Efficiency Reversible Fuel Cell (and Electrolyzer) Systems, Proceedings of the 2001 DOE Hydrogen Program Review NREL/CP-570-30535.

Regenerative Fuel Cells for High Altitude Long Endurance Solar Powered Aircraft, F. Mitlitsky, et al, $28^{th}$ Intersociety Energy Conversion Engineering Conference (IECEC), Jul. 28, 1993, UCRL-JC-113485.

Unitized Regenerative Fuel Cells for Solar Rechargeable Aircraft and Zero Emission Vehicles, F. Mitlitsky, et al, 1994 Fuel Cell Seminar, Sep. 6, 1994, UCRL-JC-117130.

Power Generation and Steam Electrolysis Characteristics of an Electrochemical Cell with a Zirconia- or Ceria-based Electrode, K. Eguchi, et al, Solid State Ionics, 86 88 (1996) 1245-1249.

\* cited by examiner

US 7,846,600 B2

ADAPTIVE PURGE CONTROL TO PREVENT ELECTRODE REDOX CYCLES IN FUEL CELL SYSTEMS

FIELD

The present invention relates generally to fuel cell systems and to solid oxide fuel cell systems in particular.

BACKGROUND

One of the biggest problems in managing fuel cell systems (especially high temperature fuel cell systems, such as solid oxide fuel cell (SOFC) systems) is avoiding oxidation of the anode electrodes (i.e., the fuel electrodes). Oxidation of the anode electrode occurs when the oxygen partial pressure in the anode chamber increases to a point where the metallic anode is no longer stable. One commonly used metal in SOFC anodes is nickel which can form nickel oxide unless a reducing environment is maintained during SOFC operation.

Oxidation of the anode electrode generally causes a performance loss or degradation of the fuel cell. This performance loss is caused by the volume change of the nickel transitioning to nickel oxide. Upon re-reduction of the anode electrode (reversing the volume increase), the microstructure of the anode shows fractures which reduce the percolation of the nickel network in the anode and thereby limit the electrical conductivity of the anode. Depending on the nature of the oxidation and re-reduction, as well as the composition and microstructure of the anode, the damage due to oxidation can be anywhere between small and catastrophic.

Oxidation of the anode electrode commonly occurs during a fuel outage or shortage while no current is flowing or while current is flowing. Normally when fuel becomes unavailable, the fuel cells are taken off current and the anode chambers are purged with a reducing gas to prevent oxidation. This purge flow has to be maintained while the fuel cells remain hot enough to oxidize. Significant volumes of purge gas may be required for the purge. In many fuel cell installations, the volume of the purge gas storage approaches or exceeds the volume of the fuel cell power generator itself. Advances in anode structure and composition have be made towards reducing the impact of oxidation, but nevertheless losses still occur and should be avoided.

SUMMARY

A method of operating a fuel cell system during a fuel outage or shortage includes detecting an open circuit voltage (OCV) of the fuel cell system, and providing a reducing purge gas flow to anode electrodes of fuel cells of the fuel cell system when the OCV approaches, reaches or falls below a threshold value below which oxidation of the anode electrodes occurs.

A fuel cell system includes a fuel cell stack comprising a plurality of fuel cells, a reducing purge gas vessel, and a control system. The control system provides a reducing purge gas flow from the purge gas vessel to anode electrodes of the fuel cells when an open circuit voltage (OCV) of the stack approaches, reaches or falls below a threshold value below which oxidation of the anode electrodes occurs.

DETAILED DESCRIPTION

Figure 1A:
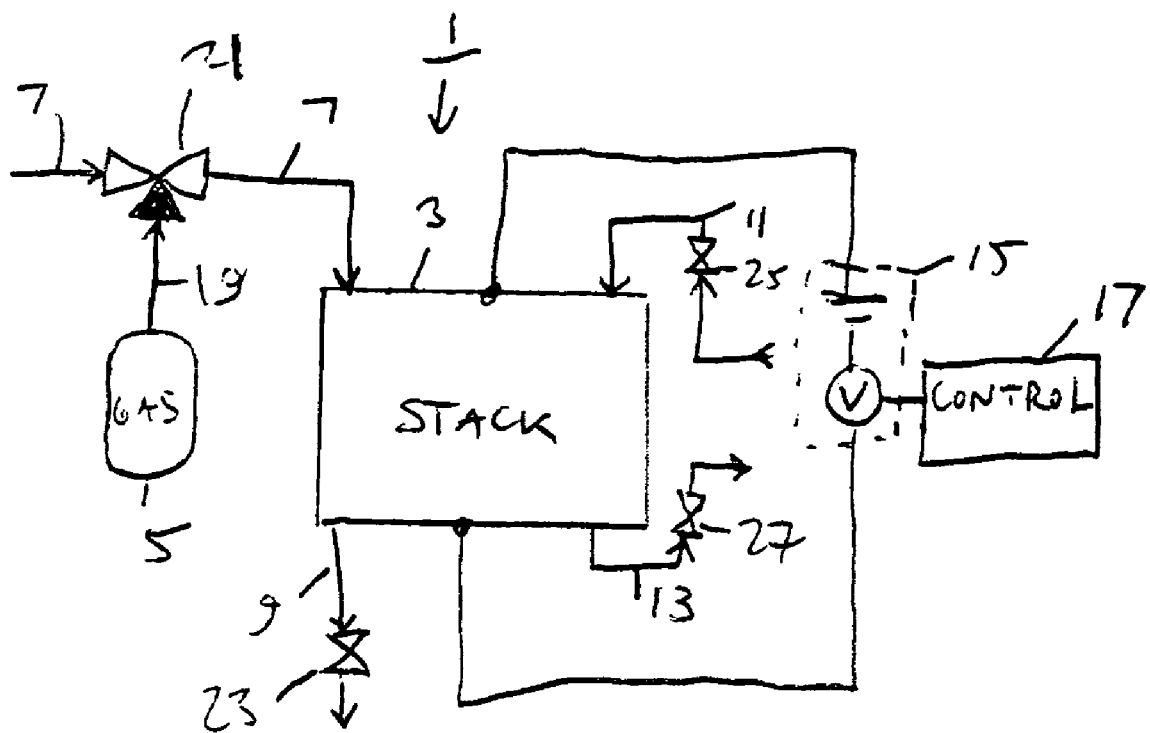
FIGS. 1A, 1B, 1C and 2 are schematic diagrams of a fuel cell system according to the embodiments of the invention.

The present inventor has realized that a fuel cell may be configured to provide a simple feedback which can be used to meter and minimize the purge gas flow. A purge gas stream flow into a fuel cell system can be controlled using readily available system parameters.

It is well known that the voltage measured under no electrical load, which is called Open Circuit Voltage (OCV), is an accurate measurement of the ratio of oxygen partial pressure between the anode (i.e., fuel) and cathode (i.e. air) side of a fuel cell, such as a SOFC. A SOFC contains a ceramic electrolyte, such as a stabilized zirconia (for example yttria or scandia stabilized zirconia), an anode or fuel electrode, such as a nickel-stabilized zirconia cermet, and a cathode or air electrode, such as LSM. Since the oxygen partial pressure in the cathode chamber is usually well known (it is generally the same as atmospheric air pressure), OCV provides an accurate indication of oxygen partial pressure in the anode chamber.

The stability of the anode electrode depends on temperature and the oxygen partial pressure. In other words, the anode oxidizes above a threshold oxygen partial pressure, which varies with temperature. Using the OCV of a fuel cell, the purge gas flow can be controlled to maintain OCV above the critical threshold value below which anode oxidation occurs. By maintaining the OCV above the threshold value, the oxygen partial pressure is maintained below a critical threshold value above which anode oxidation occurs.

In order to minimize purge gas flow in case of a fuel outage or shortage, the fuel cell system is closed off both at the inlet and outlet. For example, the system may be closed off by shutting off the fuel inlet and fuel exhaust conduits, such as by switching valve position in these conduits. The valves may be operated manually or automatically.

Typically, SOFC systems are not hermetic and atmospheric oxygen will slowly seep into the anode loop, thus reducing the OCV. Once the OCV approaches, reaches or drops below a critical threshold value, the anode electrode can be purged with a mildly reducing gas, such as hydrogen, carbon monoxide or forming gas (i.e., nitrogen and hydrogen mixture), thereby reestablishing a higher OCV. After a short purge, the system is sealed off again and OCV is monitored to detect when the next purge is required. The purge duration depends on the purge gas, temperature, and other parameters, but is usually conducted for a sufficient time to raise the OCV above the threshold value. Using this method, the amount of purge gas can be significantly reduced.

The system OCV may be monitored by an operator or automatically by a control system, such as a computer and/or a control panel. During a fuel outage or shortage, when the OCV drops below or reaches the threshold value, one or more valve positions are switched to provide the purge gas flow into the anode chamber. If desired, the valve positions may be switched when the OCV approaches the threshold value, but is still above this value, such as, for example, when the OCV is within 1 to 30 mV from the threshold value.

For example, as shown in FIG. 1A, the system 1 includes a fuel cell stack 3, such as a SOFC stack, and a purge gas vessel 5, such as a gas tank. A fuel inlet conduit 7 provides fuel, such as hydrogen or a hydrocarbon fuel, into the anode side of the stack 3. A fuel exhaust conduit 9 removes the fuel exhaust from the stack. An air inlet conduit 11 provides air into the cathode side of the stack 3 while the air exhaust conduit 13 removes the air exhaust from the stack. The stack 3 is electrically connected to a power conditioning subsystem 15 which receives the electrical power generated by the stack and which can measure the voltage produced by the stack. The subsystem 15 is electrically connected to a control system 17, such as a computer and/or a control panel.

Figure 1B:
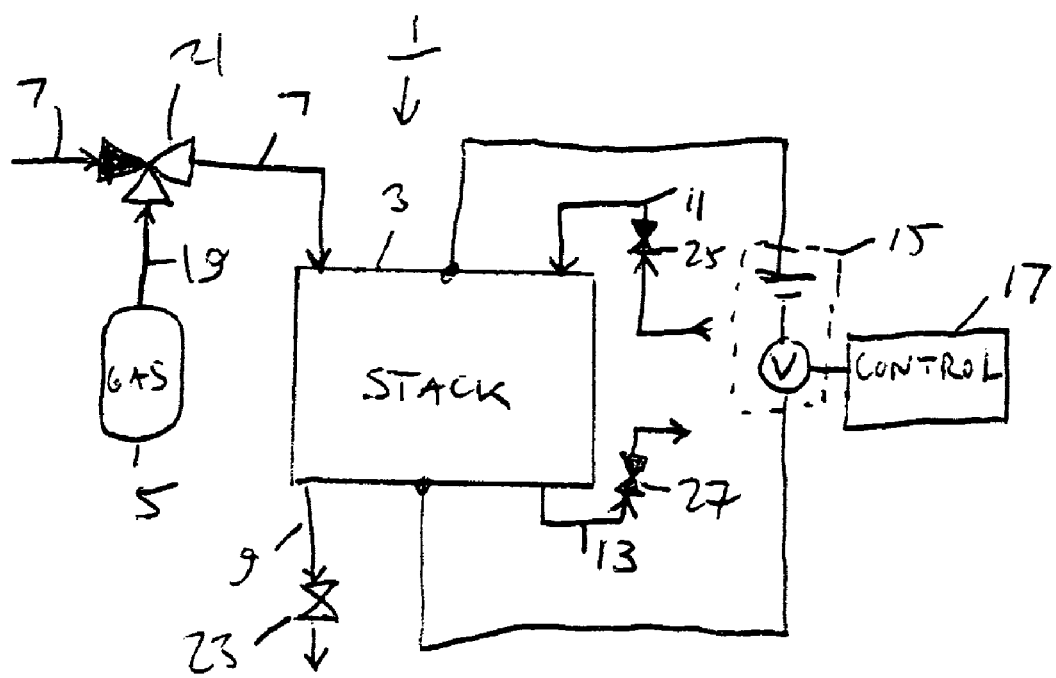
Figure 1C:
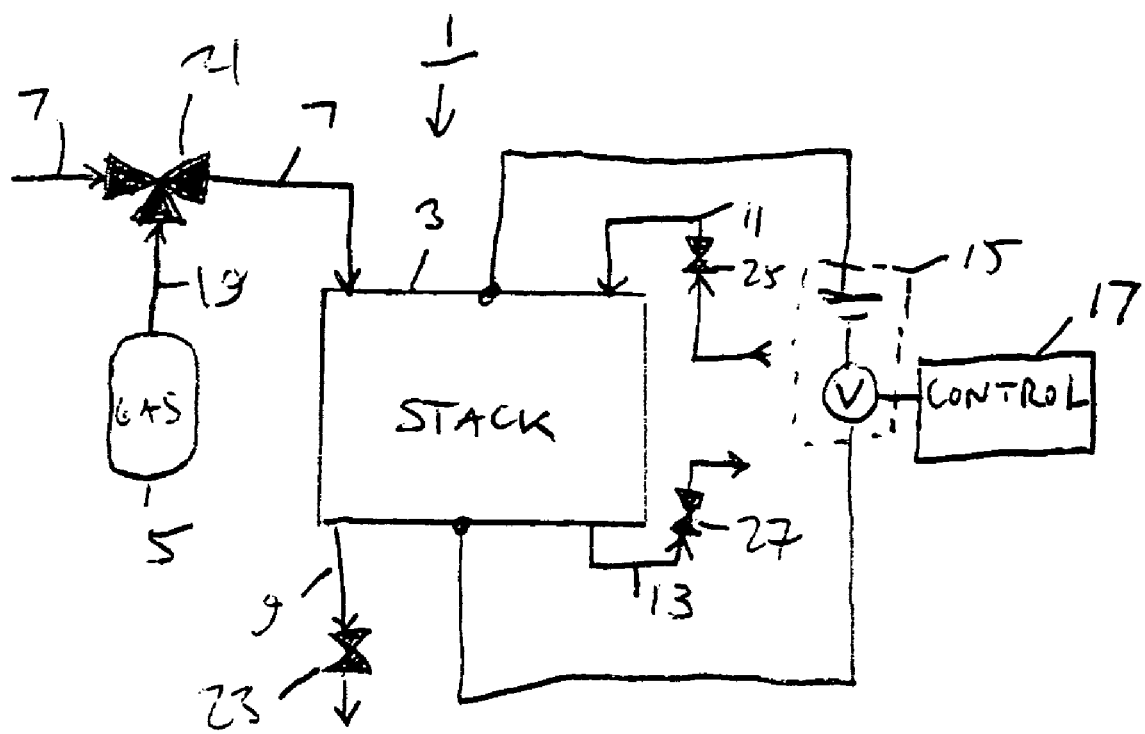

In the example shown in FIG. 1A, the purge gas vessel 5 is connected to the fuel inlet conduit 7 via conduit 19 and a three way valve 21. The three way valve 21 in the fuel inlet conduit may be used to switch between a fuel inlet stream position which provides the fuel inlet stream into the fuel cell anode chambers, a purge gas stream position which provides the purge gas into the into the fuel cell anode chambers, and a closed position which seals off the fuel cell anode chambers. FIG. 1A illustrates the system 1 with the valve 21 positioned in the fuel inlet stream position. The other valves 23, 25 and 27, which are located in conduits 9, 11 and 13, respectively, are open. In this configuration, the fuel inlet stream and air inlet stream are provided into the stack. FIG. 1B illustrates the system 1 with the valve 21 in the purge gas stream position. Valve 23 is open to allow the purge gas to leave the stack, while valves 25 and 27 are closed. In this configuration, the purge gas stream is provided into the stack. FIG. 1C illustrates the system 1 with the valve 21 in the closed position. The other valves 23, 25 and 27 are also closed. In this configuration, no gas streams are provided into the stack. During a fuel outage or shortage, the valves are switched from the position shown in FIG. 1C to the position shown in FIG. 1B to provide the purge gas flow into the stack, and then back to the position shown in FIG. 1C after the purge is completed. When the fuel outage or shortage is over, the valves are switched to the position shown in FIG. 1A.

Figure 2:
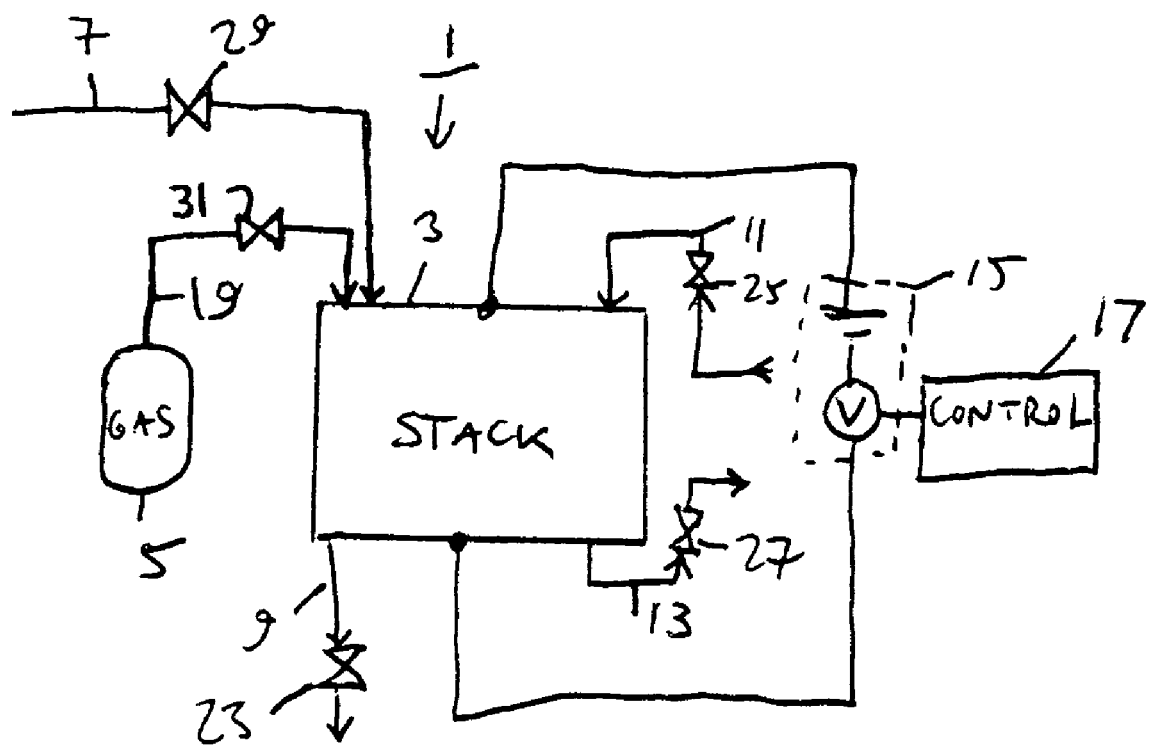

Alternatively, as shown in FIG. 2, separate valves may be used to control the fuel and purge gas flow. A first valve 29 in conduit 7 controls the fuel inlet stream flow, and switches between the fuel inlet stream position and the closed position. A second valve 31 in conduit 19 is used to control the flow of the purge gas inlet stream into the anode side of the stack. If desired, conduit 19 may be connected directly to the stack 3 rather than to the fuel inlet conduit 7.

The valves may be operated manually by an operator or electronically by the control system 17. The control system may be operated by an operator to switch the valves. Alternatively, the control system may switch the valves automatically without operator input based on the detected OCV.

The threshold voltage at which oxidation occurs can be easily experimentally determined. During a slow increase of anode oxygen partial pressure, a continuous drop of OCV is observed until the oxidation threshold is reached. At the oxidation threshold, the two-phase mixture of metal and metal oxide in the anode will maintain the oxygen partial pressure for a while and the OCV temporarily levels off in a plateau. It is this voltage level that has to be avoided in order to avoid oxidation. For a SOFC with a nickel based anode, such as a nickel-stabilized zirconia cermet anode, this OCV threshold value is about 690 mV at 850 C. At other temperatures and/or other anode compositions, this OCV threshold value may be determined from the location of the plateau in the plot of OCV versus time.

In one aspect of the invention, the OCV threshold values are predetermined for a particular fuel cell stack for various temperatures before the stack is put into service. Then, in case of a detected or pre-planned fuel outage or shortage, the OCV and temperature are monitored, and when the OCV approaches, reaches or drops below the predetermined OCV threshold value for a particular temperature, the purge gas flow is initiated.

In another aspect of the invention, the OCV threshold values are not predetermined. Instead, in case of a detected or pre-planned fuel outage or shortage, the OCV is monitored. When the plateau in the measured OCV value as a function of time is detected, the purge gas flow is initiated at that time or soon after the end of the detected plateau.

In another embodiment, the purge material is stored in a liquid, gel or solid form and is then converted to a gas prior to introduction into the fuel cell stack. This embodiment is advantageous because liquid, gel or solid phase material storage vessel may take up less space than a gas phase material storage vessel. For example, the purge gas material may be stored as an ambient pressure hydrocarbon liquid, or a hydrocarbon gel or solid tablets (such as tablets used as camping stove fuel). The liquid, gel or solid purge material is stored in a purge material storage vessel located in fluid communication with an evaporator. For example, the liquid purge material may be stored in a liquid storage tank and then provided to an evaporator through a pipe or other conduit. Alternatively, the liquid material may be stored in chamber located inside the evaporator, where the chamber comprises the storage vessel. The solid or gel material may also be stored in a chamber inside the evaporator. When a purge gas is needed, this liquid, gel or solid material is evaporated. The evaporated material is either: i) fed directly into the fuel cell stack, or ii) passed through a partial oxidation reformer (also known as a catalytic partial oxidation reactor or CPOX) to be converted into a non-condensing reducing gas, and then provided into the fuel cell stack. The CPOX contains a catalyst which converts a mixed hydrocarbon purge gas and air inlet stream (s) into a hydrogen containing purge gas stream. Thus, the use of the CPOX may reduce potential condensation problems. The use of a liquid, gel or solid purge material requires a more complex apparatus due to the addition of an evaporator and optional CPOX reformer. However, for a sufficiently large plant, the benefit of a reduced purge material storage vessel may outweigh the detriment of additional equipment. The evaporator and/or CPOX reformer may comprise small, battery powered components that do not take up a large amount of space.

Although the invention has been described in detail for the purpose of illustration, it is understood that such detail is solely for that purpose, and variations can be made therein by those skilled in the art without departing from the spirit and scope of the invention which is defined by the following claims. All of the publications, patent applications and patents cited in this specification are incorporated herein by reference in their entirety.

What is claimed is:

1. A method of operating a fuel cell system during a fuel outage or shortage, comprising:
   detecting an open circuit voltage (OCV) of the fuel cell system;
   providing a reducing purge gas flow to anode electrodes of fuel cells of the fuel cell system when the OCV approaches, reaches or falls below a predetermined threshold value, or reaches or falls below a detected threshold value below which oxidation of the anode electrodes occurs; and
   terminating the purge gas flow to the anode electrodes when the OCV increases above the threshold value.

2. The method of claim 1, further comprising intermittently providing the purge gas flow to the anode electrodes a plurality of times when the OCV approaches, reaches or falls below the predetermined threshold value or reaches or falls below the detected threshold value.

3. The method of claim 1, wherein the purge gas flow is provided to the anode electrodes when the OCV approaches the predetermined threshold value.

4. The method of claim 1, wherein the purge gas flow is provided to the anode electrodes when the OCV reaches the predetermined or the detected threshold value.

5. The method of claim 1, wherein the purge gas flow is provided to the anode electrodes when the OCV falls below the predetermined or the detected threshold value.

6. The method of claim 1, wherein the purge gas flow comprises at least one of hydrogen, forming gas and carbon monoxide.

7. The method of claim 1, wherein the fuel cells comprise solid oxide fuel cells.

8. The method of claim 1, wherein the OCV is detected by an operator and the purge gas flow is turned on by the operator when the OCV reaches or falls below the detected threshold value.

9. The method of claim 1, wherein the OCV is detected by a control system and the purge gas flow is turned on by the control system when the OCV reaches or falls below the detected threshold value.

10. The method of claim 1, wherein the purge gas flow is provided to the anode electrodes when the OCV approaches, reaches or falls below a predetermined threshold value.

11. The method of claim 1, wherein the purge gas flow is provided to the anode electrodes when the OCV approaches, reaches or falls below the threshold value which corresponds to a plateau in a plot of OCV versus time.

12. The method of claim 1, further comprising storing a liquid, gel or solid purge material and evaporating the purge material to provide the purge gas flow.

* * * * *